United States Patent
Camp et al.

(10) Patent No.: US 8,028,436 B2
(45) Date of Patent: Oct. 4, 2011

(54) HOOK FOR DETECTION OF CHAIN SLING FAILURE

(75) Inventors: David Camp, Cokato, MN (US); Darin Young, Cokato, MN (US)

(73) Assignee: Machining and Welding by Olsen, Inc., Minneapolis, MN (US)

( * ) Notice: Subject to any disclaimer, the term of this patent is extended or adjusted under 35 U.S.C. 154(b) by 108 days.

(21) Appl. No.: 12/409,598

(22) Filed: Mar. 24, 2009

(65) Prior Publication Data
US 2010/0242296 A1    Sep. 30, 2010

(51) Int. Cl.
*G01B 3/10* (2006.01)
(52) U.S. Cl. ............................................ 33/760; 33/712
(58) Field of Classification Search ............ 33/757–760, 33/768, 770, 613, 712, 732, 701
See application file for complete search history.

(56) References Cited

U.S. PATENT DOCUMENTS

| | | | | |
|---|---|---|---|---|
| 2,711,030 | A * | 6/1955 | Drew et al. ...................... | 33/758 |
| 4,092,781 | A | 6/1978 | Blake | |
| 4,151,652 | A | 5/1979 | Palma | |
| 4,348,907 | A | 9/1982 | Giese | |
| 5,003,913 | A | 4/1991 | Jensen | |
| 5,228,149 | A * | 7/1993 | Phinn, Jr. ........................ | 33/759 |
| 5,257,729 | A * | 11/1993 | Silvernail ........................ | 33/760 |
| 5,421,100 | A * | 6/1995 | Leore ............................... | 33/770 |
| 5,458,946 | A * | 10/1995 | White, Jr. ......................... | 33/758 |
| 5,720,106 | A * | 2/1998 | Serksnis et al. .................. | 33/759 |
| 5,815,873 | A * | 10/1998 | Jones ............................... | 33/760 |
| 6,158,139 | A * | 12/2000 | Bond ............................... | 33/768 |
| 6,226,885 | B1 * | 5/2001 | Korich ............................. | 33/760 |
| 6,237,239 | B1 * | 5/2001 | Miyazaki ......................... | 33/512 |
| 6,481,110 | B1 * | 11/2002 | Butler .............................. | 33/393 |
| 7,181,860 | B1 * | 2/2007 | Umholtz .......................... | 33/758 |
| 7,487,600 | B1 * | 2/2009 | Cooper ............................ | 33/770 |
| 2001/0047283 | A1 | 11/2001 | Melick et al. | |
| 2002/0026723 | A1 * | 3/2002 | Savalla ............................ | 33/414 |
| 2004/0040196 | A1 * | 3/2004 | Schwartz ......................... | 33/768 |
| 2005/0011082 | A1 * | 1/2005 | Smith .............................. | 33/758 |

OTHER PUBLICATIONS

Chain Sling Load Test Report Form, Dec. 2007, Brookhaven National Laboratory, US.

* cited by examiner

*Primary Examiner* — Yaritza Guadalupe
(74) *Attorney, Agent, or Firm* — Moore & Hansen, PLLP

(57) ABSTRACT

An apparatus for evaluating the condition of a lift sling. The apparatus includes a body with an upper section and a lower section. The lower section includes a cradle member with a load bearing surface that engages an inner surface of a connecting link at one end of a sling. The apparatus includes an engagement section that receives and positions the end of a measuring device so that it is in tangential alignment with the load bearing surface of the cradle member. In use, one end of a sling is positioned on the load bearing surface of the cradle member and one end of a measuring device is positioned on the engagement section of the apparatus. The apparatus is then raised so that the sling and the measuring device are hanging freely. The reach of the sling is then measuring using the measuring device.

27 Claims, 5 Drawing Sheets

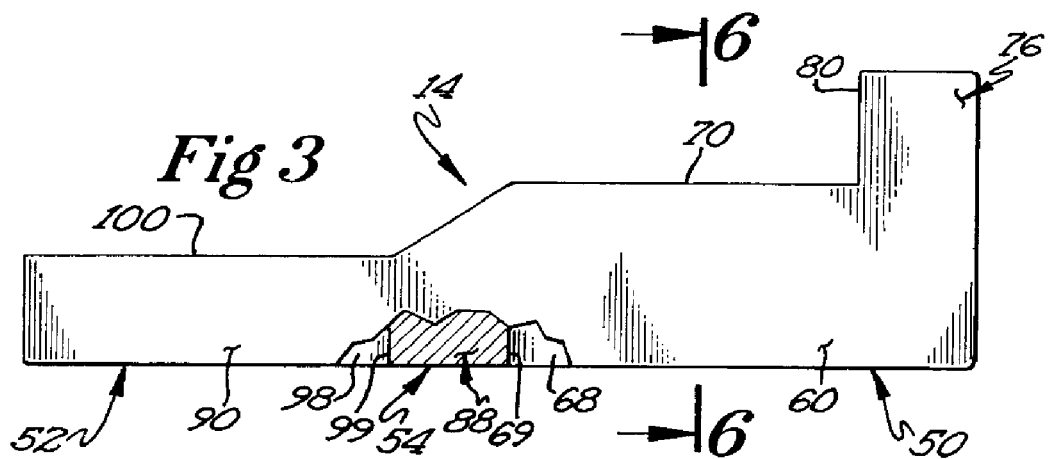
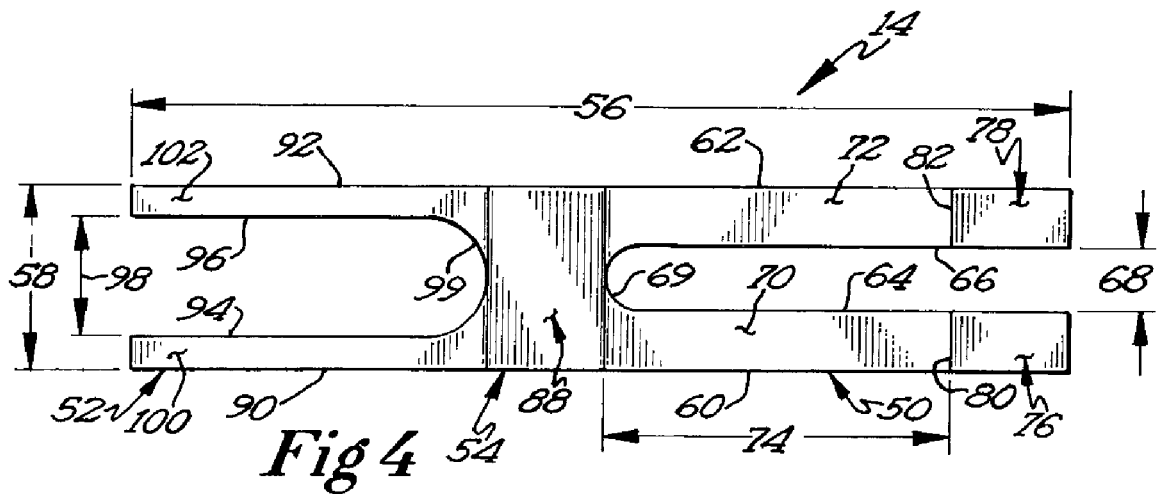
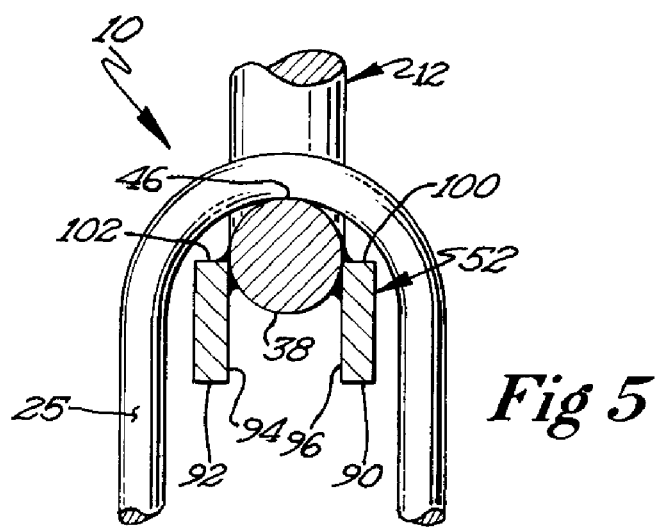

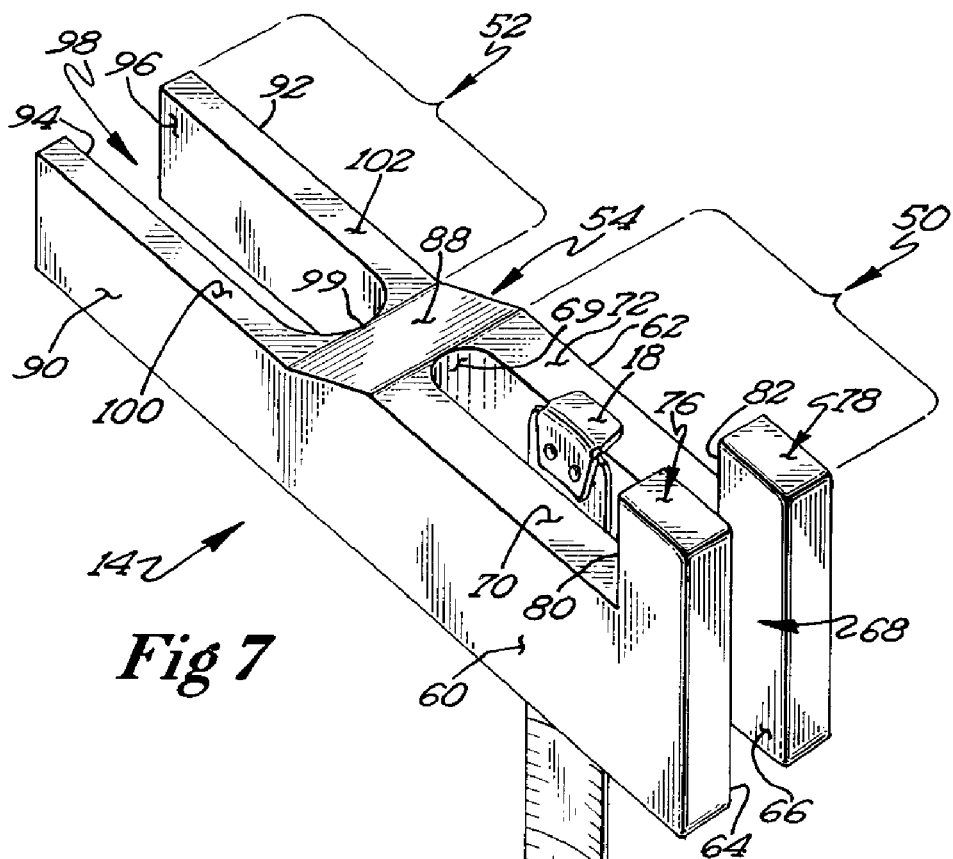
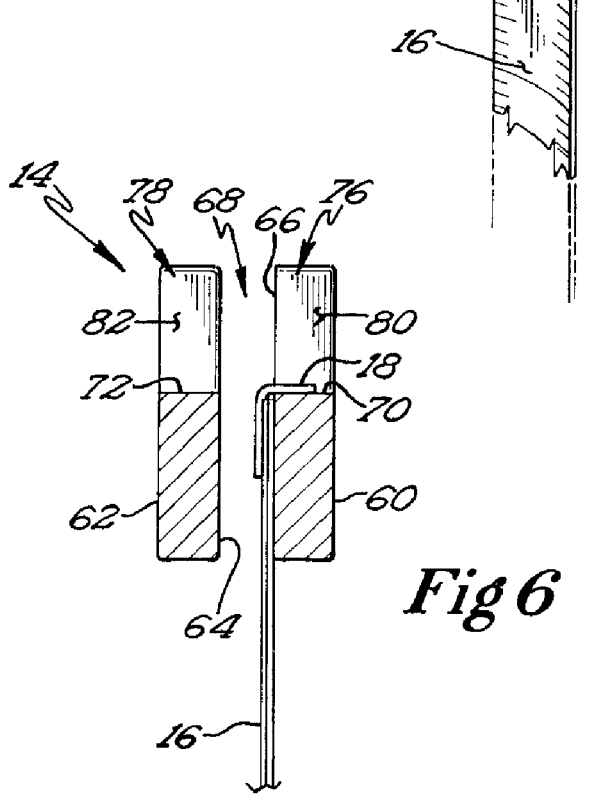

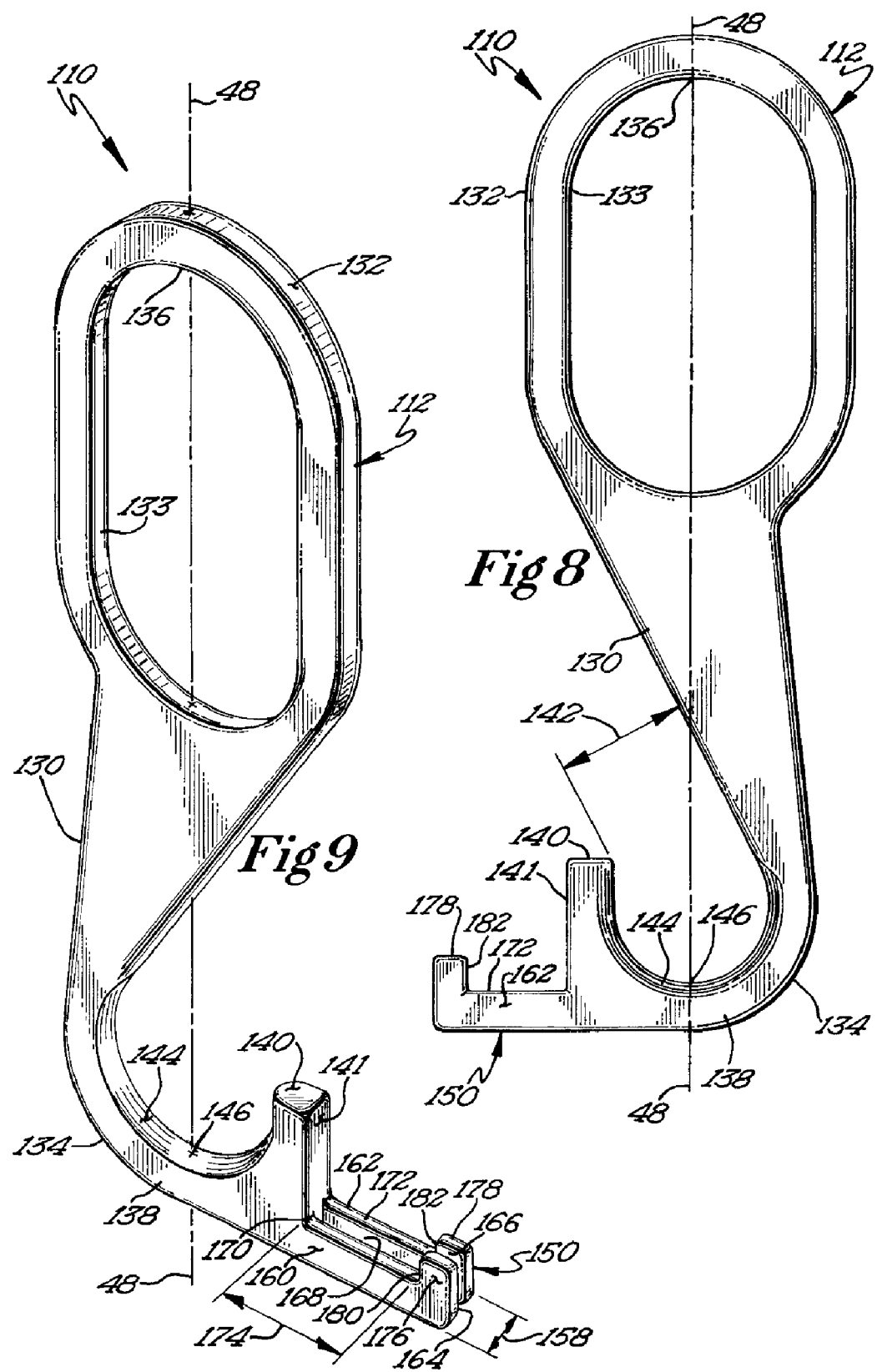

HOOK FOR DETECTION OF CHAIN SLING FAILURE

BACKGROUND

This application relates generally to elongated, flexible members that are used to lift and/or suspend and move heavy and/or bulky objects. More particularly, this application relates to lift slings. Even more particularly, this application relates to an apparatus and method of evaluating the physical condition of a lift sling.

In many industries, large and/or heavy objects must be moved from one position to another position, or be lifted to a different elevation, or be loaded onto another object. For objects that are too large, bulky or heavy to be lifted by hand, machines such as cranes or hoists are commonly used. Such machines are usually provided with a cable that is connected to a sheave block or a hook. Often, the sheave block or hook cannot be connected directly to the object to be lifted and instead requires an additional member that is interposed between the sheave block or hook and the object. The additional member is known as a sling. The sling can take different forms, depending upon the nature of the object to be lifted. With the simplest form, the sling comprises an elongated, flexible member or leg, which includes an upper end that is connectable to the sheave block or hook, and a lower end having a fitting that is connectable to the object. Usually, the upper end is connected to an enlarged, closed link, known as a "master link", but it can also terminate with a fitting such as a hook. With more elaborate forms, which are useful in lifting irregularly shaped, bulky objects, the sling can include two, three, four, or even more elongated, flexible members or legs.

Because slings are often used in harsh, industrial conditions they can be inadvertently or unintentionally damaged. Even a sling used with the utmost of care can, over time, become nicked, cracked, stretched, bent, corroded, or otherwise altered from its original state. These conditions can be the result of overloading, improper storage, interaction with sharp corners, dragging along a floor or an abrasive surface, kinking or twisting, shock loading, hostile environments such as excessive heat or cold, chemicals, weld spatter, etc.

Because of the consequences of using defective slings can be catastrophic, the government, through the occupational safety and health administration (OSHA), has mandated that slings be inspected. Specifically, slings must be inspected before each and every time they are to be used. In addition, slings must be inspected at a minimum of at least once a year. One component of the inspection consists of a visual inspection, with attention being paid to any obvious changes in the slings that are indicative of damage. For example, stretching, bending, nicks, cracks, corrosion. In each instance where one of the above conditions is detected, the sling must be removed from service. However, there are situations in which a sling may be defective, though not visibly so. For, example, a sling may be imperceptibly deformed due to overloading. In such situations, the sling will look normal, but it should be removed from service. Therefore, in addition to visual inspections, a sling must be inspected using changes physical parameters such as link diameter and reach, which also indicate wear and tear.

This application provides an apparatus and method for evaluating elongated lifting members by detecting changes in physical parameters of the lifting members.

SUMMARY

In one embodiment, an apparatus for evaluating the physical condition of an elongated lifting member includes a body with an upper section, a main section, and a lower section. The lower section includes a cradle member that has a support zone that is configured to engage an inwardly facing surface at an end of a sling. A bracket attached to the body includes a measuring device engagement section that precisely positions a tape measure so that its indexing mark is at the same elevation as the upper, inner facing surface of a link that is positioned on the cradle member. In a preferred method of use, the apparatus is attached to a suitable support so that it is suspended above the ground at a height that is convenient to a user. One end of a lift sling is then positioned on the cradle member, and one end of a measuring device is secured to the bracket. The apparatus is then raised so that the lift sling and the measuring device are completely suspended and hanging freely. The reach of the lift sling is then determined by extrapolating a horizontal line from the inner, lowermost surface of the free end of the lift sling to the measuring device. This measurement is then compared with the reach as originally measured and memorialized by the manufacturer. If the reach lengths are different, the lift sling must be removed from service.

In another embodiment, the apparatus includes a body with an upper section, a main section, a lower section and a measurement device engagement section. With this embodiment, the upper section comprises a closed, generally oval loop and the lower section includes a only a portion of the aforementioned bracket, namely an engagement section that extends in a general tangential direction from a cradle member of the lower section.

DESCRIPTION OF THE DRAWINGS

FIG. 3 is a side elevational view of the bracket of FIG. 1;

FIG. 4 is a top plan view of the bracket of FIG. 3;

FIG. 5 is a partial, cross-sectional elevational view of an attachment end of the bracket, the body of the apparatus, and a lift sling end taken along the vertical line of force/center of gravity of FIG. 1;

FIG. 6 is a cross-sectional, elevational view of a measurement device engagement section of the bracket of FIG. 3, and a measuring device shown in phantom;

FIG. 7 is a perspective view of the bracket of FIG. 3 with a measuring device secured thereto;

FIG. 8 is an elevational representation of an alternative embodiment of an apparatus used to evaluate the condition of a lift sling; and, FIG. 9 is a perspective view of the apparatus of FIG. 8.

DETAILED DESCRIPTION

Figure 1:
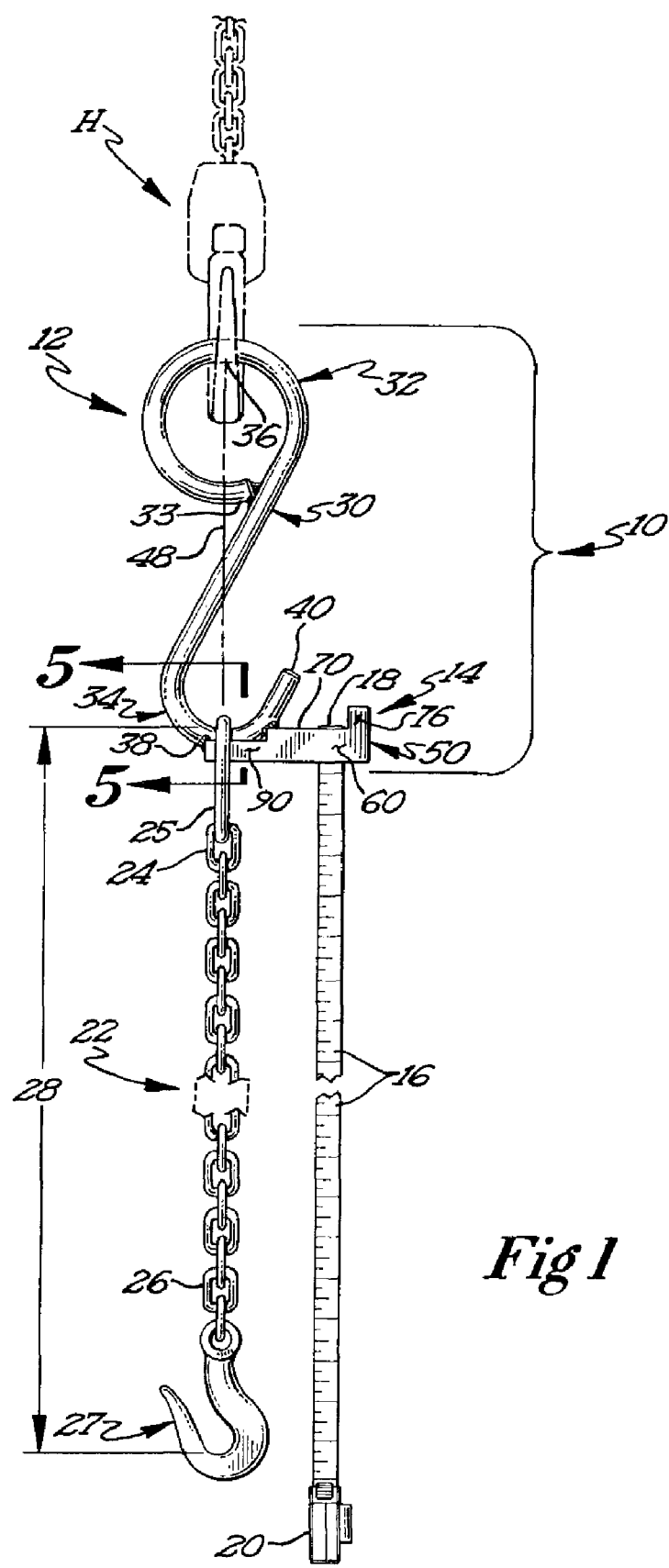
FIG. 1 is an elevational representation of an embodiment of an apparatus used to evaluate the condition of a lift sling.

A preferred embodiment of the apparatus 10 as it is being used to evaluate a flexible lifting member is illustrated in FIG. 1. The apparatus 10 is suspended by a vertical support, preferably an adjustable hoist "H" that is equipped with a suitable lifting hook. The apparatus 10 comprises an elongated body 12 and a bracket 14 that is attached to the elongated body 12. A measuring device 16 is received and retained by the bracket 14. The measuring device 16 is of the type that includes an end that is able to be engaged by the bracket. Preferably, the measuring device 16 includes an end with a tang or catch 18 that has an extension that is perpendicular to the plane of the measuring device. More preferably, the measuring device 16 is a flexible, metallic, rule that is received within a protective housing 20 when not in use.

An elongated flexible member 22 that is to be evaluated is connected to the elongated body 12 of the apparatus 10. The elongated flexible member 22 includes a first end 24 that is connected to a master link 25 and a second end 26 that is connected to a fixture 27. The reach 28 of the flexible member is the length measured from the load bearing point on the master link to the load bearing point at the fixture 27. Note that the load bearing surfaces of the elongated body 12 and the elongated flexible member 22 are in alignment with the vertical line of force 48. As will be appreciated, the weight of the elongated flexible member that is being evaluated will be sufficiently great enough to counteract the force exerted by measuring device 16 and the bracket 14 and thus maintain the vertical alignment of the hoist H, the body 12 and the elongated flexible member 22.

Figure 2:
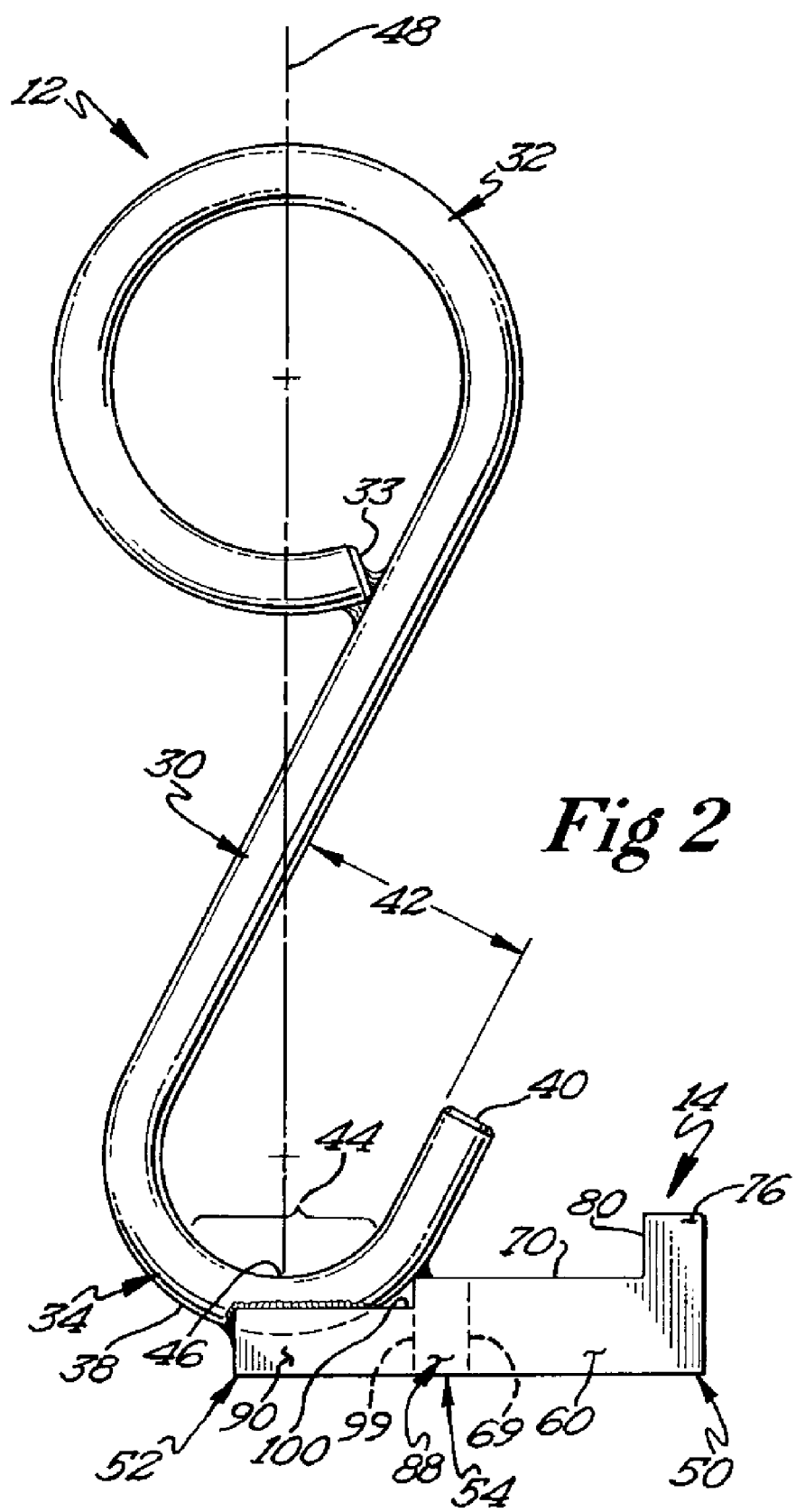
FIG. 2 is an isolated, elevational view of the apparatus of FIG. 1 showing the body of the apparatus and a bracket attached thereto.

With regard to FIG. 2, the elongated body 12 of the apparatus 10 includes a main section 30, an upper section 32 with an end 33 and a lower section 34 with a tip 40. The upper section 32 includes a support or load bearing surface 36 that engages the fixture of the hoist H of FIG. 1. The upper section 32 is formed by bending the upper end of the elongated body into a generally circular shape, so that the end 33 confronts the main section 30 of the body and forms an eye. Note that the end 33 may be connected to the main section 30 of the body by welding or the like so as to form a closed loop. The lower section 34 includes cradle member 38 that is generally u-shaped and terminates in an upwardly extending tip 40. The cradle member 38 includes an opening 42 that is sized to accept the master link 25 of the elongated flexible member 22. The generally u-shaped cradle member 38 is provided with a support zone 40 that includes a support or load bearing surface having a load bearing point or pick point 46 that is in alignment with the center of gravity or line of vertical force 48 of the apparatus.

Turning to FIGS. 3-7, the bracket 14 includes an engagement section 50, an attachment section 52 and a middle section 54 and has a length 56 of approximately 4.0 inches (10.0 cm), a width 58 of approximately 0.75 inches (1.9 cm), and arm and leg heights of approximately 0.75 inches (1.91 cm) and 0.5 inches (1.27 cm), respectively. The engagement section 50 is configured and arranged to receive and support the measuring device 16. The engagement section 50 includes a first arm 60 and a second arm 62 that are generally parallel to each other. The first and second arms 60, 62 include inner surfaces 64, 66, respectively, that define a slot 68 therebetween. The slot 68 has a width of approximately 0.0615 inch to approximately 0.5 inch (0.16 cm to 1.27 cm) and terminates at an end wall 69 at one end of a web 88 in the middle section 54. The first and second arms 60, 62 include engagement surfaces 70, 72, respectively, which are configured and arranged to engage a working end of the measuring device 16 (see, in particular, FIGS. 6 and 7) so that it is tangentially aligned with the support or load bearing surface 46 of the cradle member 38. Preferably, the working end of the measuring device includes a tang or catch 18 that is used to temporarily connect the measuring device 16 to an object to be measured. Preferably, the width of the slot 68 is less than the width of the tang 18 so as to prevent the measuring device 16 from being accidentally dislodged or jarred from the bracket 14 and falling through the slot 68.

The first and second arms 60, 62 also include first and second fingers 76, 78, respectively, that extend upwardly above the engagement surfaces 70, 72 of the respective arms 60, 62. The first and second fingers 76, 78 include stop surfaces 80, 82 that are generally perpendicular to the engagement surfaces, but which can be angled or curved with respect to the engagement surfaces. Preferably, the stop surfaces are of sufficient height so that they prevent a tang 18 of a measuring device 16 from sliding off the end of an engagement surface of an arm of the bracket 14. The stop surfaces 80, 82, along with the end wall 69 define the working length 74 of the slot 68, which is from approximately 0.5 inches (1.27 cm) to approximately 2.0 inches (5.10 cm). By having a working length that is greater than the width of the measuring device 16 it is possible to position the measuring device along the bracket 14 so as to be able to accommodate differently sized elongated flexible members. In addition, the working length 74 allows a user to readjust the position of a measuring device 16 while it is still connected to the apparatus 10 and the apparatus is in an elevated position. Preferably, the stop surfaces 80, 82 of the fingers have a generally vertical length of about 0.5 inches (1.27 cm), which is sufficient to prevent accidental dislodgement of a measuring device, but which is low enough so that the measuring device can be removed from the bracket 14 by lifting the measuring device 16 up so that the working end (generally the tang 18) is higher than the stop surfaces 80, 82 and then moving the measuring device 16 laterally out of the slot 68.

The attachment section 52 is configured and arranged to receive and engage the cradle member 38 of the lower section 34 of the elongated body 12. The attachment section 52 includes a first leg 90 and a second let 92 that are generally parallel to each other. The first and second legs 90, 92 include inner surfaces 94, 96, respectively, that define a slot 98 therebetween. The slot 98 terminates at an end wall 99 at another end of a web 88 in the middle section 54. The first and second legs 90, 92 include engagement surfaces 100, 102, respectively, which are configured and arranged to engage the cradle member 38 of the lower section 34 of the elongated body 12. Preferably, the width of the slot 98 approximates the diameter of the body 12, which in the preferred embodiment is approximately 0.5 inch (1.27 cm). As best shown in FIG. 5, the cradle member 38 is positioned so that approximately one-half of it is positioned between the inner walls 94, 96 of legs 90, 92, and approximately one-half of the cradle member 38 extends above the engagement surfaces 94, 96 of legs 90, 92. Although not shown, the cradle member 38 is attached to the legs of the bracket, preferably by weld material. It will be appreciated that the connection of the bracket to the body need not be confined to welds and that the bracket may be removably attached to the body so that it may be used with other elongated bodies.

The middle section 54 connects the engagement section 50 to the attachment section 52. The middle section 54 comprises a web 88 whose length is defined by end walls 69, 99. The web 88 includes an inclined or ramped transition that extends between the engagement surfaces 70, 72 of first and second arms 60, 62 and the engagement surfaces 100, 102 of legs 90, 92, which have heights of approximately 0.75 inches (1.91 cm) and 0.5 inches (1.27 cm), respectively.

The preferred embodiment of the apparatus is constructed from metal, preferably steel, and has a weight that is preferably greater than 1.0 lbs (0.45 kg) and more preferably approximately 1.5 lbs (0.84 kg) so that it is light enough to be easily moved from location to location and is robust enough to be able to used to evaluate heavy duty, multi-leg chain slings, which can weigh in excess of 400 lbs (181 kg). Preferably, the elongated body 12 is formed from 0.5 inch (1.27 cm) steel stock and has a reach of approximately 9.0 inches (22.86 cm).

Another preferred embodiment is depicted in FIGS. 8 and 9. Here, the elongated body 112 of the apparatus 110 includes a main section 130, an upper section 132 that includes a closed, generally ovate loop 133, and a lower section 134 with a tip 140. The upper section 132 includes a support or load bearing surface 136 that engages the fixture of the hoist H of FIG. 1. The lower section 134 includes cradle member 138 that is generally u-shaped and terminates in an upwardly extending tip 140. The cradle member 138 includes an opening 142 that is sized to accept the master link 25 of the elongated flexible member 22 (see, FIG. 1). The generally u-shaped cradle member 138 is provided with a support zone 140 that includes a support or load bearing surface with a load bearing point or pick point 146 that is in alignment with the center of gravity or vertical axis 148 of the apparatus.

The measurement device engagement section 150 of the apparatus 110 is configured and arranged to receive and support the measuring device 16 (see, for example, FIG. 7). The engagement section 150 includes a first arm 160 and a second arm 162 that are generally parallel to each other. The first and second arms 160, 162 include inner surfaces 164, 166, respectively, that define a slot 168 therebetween. The slot 168 has a width of approximately 0.0625 inch to approximately 0.5 inch (0.15 cm to 1.27 cm) and terminates at a wall 141 that forms an outer surface of tip 140, and which extends in a direction that is generally parallel to the center of gravity 48. The first and second arms 160, 162 include engagement surfaces 170, 172, respectively, which are configured and arranged to engage a working end of the measuring device 16 (see, in particular, FIGS. 6 and 7) so that it is tangentially aligned with the load bearing point or pick point 146 of the cradle member 138. Preferably, the working end of the measuring device includes a tang or catch 18 that is used to temporarily connect the measuring device 16 to an object to be measured. Preferably, the width of the slot 168 is less than the width of the tang 18 so as to prevent the measuring device 16 from being accidentally dislodged or jarred from an engagement section and falling through the slot 168. As will be appreciated, the curved surfaces of the cradle sections of the embodiments are preferred because it enables a sling to naturally gravitate toward the lowest point of the apparatus, through which the center of gravity and/or line of vertical force 48 passes. In that regard, it will also be appreciated that the support zone 144 (including the load bearing point or pick point 146) of apparatus 110 will be rounded over or otherwise provided with an edge that will provide a single point of contact.

The first and second arms 160, 162 also include first and second fingers 176, 178, respectively, that extend upwardly above the engagement surfaces 170, 172 of the respective arms 160, 162. The first and second fingers 176, 178 include stop surfaces 180, 182 that are generally perpendicular to the engagement surfaces, but which can be angled or curved with respect to the engagement surfaces. Preferably, the stop surfaces are of sufficient height so that they prevent a tang 18 of a measuring device 16 from sliding off the end of an engagement surface of an arm of the engagement section 150. The stop surfaces 180, 182, along with the wall 141 define the working length 174 of the slot 168, which is from approximately 0.5 inches (1.27 cm) to approximately 2.0 inches (5.10 cm), and preferably approximately 1.3 inches (3.30 cm). By having a working length that is greater than the width of the measuring device 16 it is possible to position the measuring device along the bracket 14 so as to be able to accommodate differently sized elongated flexible members. In addition, the working length 174 allows a user to readjust the position of a measuring device 16 while it is still connected to the apparatus 110 and the apparatus is in an elevated position. Preferably, the stop surfaces 180, 182 of the fingers have a generally vertical length of about 0.5 inches (1.27 cm), which is sufficient to prevent accidental dislodgement of a measuring device, but which is low enough so that the measuring device can be removed from the engagement section 150 by lifting the measuring device 16 up so that the working end (generally the tang 18) is higher than the stop surfaces 180, 182 and then moving the measuring device 16 laterally out of the slot 168. The first and second arms 160, 162 include lower surfaces that are generally parallel to their respective engagement surfaces 170, 172, and which are tangentially aligned with the bottom surface of the cradle member 138.

A preferred method of fabricating the apparatus 110 is to cut it out of steel plate stock using conventional tools such as saws or cutting torches and finished using abraders such as files and grinders. Preferably, the edges are rounded over, with particular attention paid to the support surface and the load bearing point of pick point. It is envisioned, however, that the apparatus may be cast or stamped and later finished.

A method for evaluating an elongated flexible lifting member with the preferred embodiment of the apparatus is as follows. First, the apparatus is attached to a hoist. Then one end of an elongated flexible member is connected to the apparatus so that it is supported by the load bearing surface of the apparatus. Then a measuring device is attached to the apparatus, preferably by inserting the working end of the measuring device into a generally vertical slot on the apparatus, and then seating the working end against an engagement surface of the apparatus, which is in tangential alignment with the load bearing surface of the apparatus. Then the hoist is raised so that the elongated flexible member is hanging freely therefrom. As the hoist is raised, the measuring device may extend downward of its own accord. However, if this does not occur, the measuring apparatus can be pulled down so that it extends below the bottom of the flexible member and it is also freely hanging from the apparatus. The length of the reach of the elongated flexible member is then measured and compared with the length of the original reach as supplied by the manufacture of the elongated flexible member. If the length of the recently measured reach is larger than the original reach, the elongated flexible member is removed from service. For multi-leg elongated flexible lifting members, the procedure is similar as discussed above, with the additional steps of measuring the reach of each leg.

The foregoing is considered as illustrative only. Furthermore, since numerous modifications and changes will readily occur to those skilled in the art, the exact construction and operation shown and described is only an example of a preferred embodiment. The invention is defined by the following claims.

What is claimed is:

1. An apparatus, useable with a support and a measuring device, for evaluating the physical condition of a chain, the apparatus comprising:
   a body with an upper section and a lower section, with the upper section connectable to the support, and with the lower section including a cradle member configured and arranged to support the chain hanging therefrom; and
   a measuring device engagement section having a surface that extends laterally from said lower section when the upper section of the apparatus is connected to the support, with the surface configured and arranged to support the measuring device hanging therefrom so that the measuring device is substantially parallel to the chain.

2. The apparatus of claim 1, wherein the measuring device engagement section comprises an elongated arm and the surface of the measuring device engagement section is generally linear.

3. The apparatus of claim 2, wherein the measuring device engagement section further comprises an edge extending vertically from one end of the generally linear surface.

4. The apparatus of claim 1, wherein the measuring device engagement section comprises a pair of generally parallel arms, with at least one arm having a generally linear surface.

5. The apparatus of claim 4, wherein the parallel arms define a vertically oriented slot.

6. The apparatus of claim 5, wherein the slot has a width of approximately 0.0625 of an inch (0.15 cm) to approximately 0.375 of an inch (0.95 cm).

7. The apparatus of claim 5, wherein the slot has a length of approximately 2.0 inches (5.10 cm).

8. The apparatus of claim 4, wherein the parallel arms are configured and arranged to receive a portion of the measuring device therebetween.

9. The apparatus of claim 1, wherein the cradle member is generally U-shaped and has an upwardly facing opening.

10. The apparatus of claim 9, wherein the upwardly facing opening of the cradle member is approximately 2.0 inches (5.10 cm) wide.

11. The apparatus of claim 1, wherein the cradle member has a support surface with a load bearing point that is located substantially within a plane defined by the surface of the measuring device engagement section.

12. The apparatus of claim 1, wherein the cradle member has a support zone, a portion of which resides in a plane defined by the surface of the measuring device engagement section.

13. The apparatus of claim 1, wherein the apparatus has a weight that is greater than approximately 1 lb (0.45 kg.).

14. An apparatus suitable for suspending an elongated flexible lifting member so that its length can be measured, the apparatus comprising:
    a body with an upper section and a lower section, with the lower section having a load bearing surface configured and arranged to engage and support the elongated flexible lifting member at one end of the lifting member such that when the elongated flexible lifting member is supported by the body, a line of vertical lifting force is established; and
    a measuring device engagement section with a first surface that is substantially transversely oriented to said line of vertical lifting force.

15. The apparatus of claim 14, wherein the measuring device engagement section comprises a second surface that is substantially transversely oriented to said line of vertical force, with said first and second surfaces spaced apart from each other and defining a generally vertical slot therebetween.

16. The apparatus of claim 14, wherein said first surface has a working length that is defined by an upwardly extending tip of said load bearing surface and an upwardly extending edge of a finger on the measuring device engagement section.

17. The apparatus of claim 14, wherein said lower section includes an upwardly extending tip and said measuring device engagement section extends outwardly from said upwardly extending tip.

18. The apparatus of claim 14, wherein said measuring device engagement section is located substantially within a plane defined by the body of the apparatus.

19. A method of measuring a length of a chain sling, the method comprising the steps of:
    a. providing an apparatus having a body with an upper section and a lower section, the apparatus further comprising a bracket attached thereto, the bracket having a measuring device engagement section tangentially aligned with a chain sling engagement surface on the lower section;
    b. attaching the upper section of the body to an elevated support;
    c. attaching one end of the chain sling to the lower section of the body so that the chain sling is engaged by the chain sling engagement surface and the chain sling hangs freely therefrom;
    d attaching a measuring device to the measuring device engagement section of the bracket,
    e. moving the measuring device so that a portion of it extends below the remaining end of the chain sling; and,
    f. measuring the length of the chain sling.

20. A method of measuring a chain sling, the method comprising the steps of:
    a. providing an apparatus having an upper section, a lower section and a measuring device engagement section that is in tangential alignment with a chain sling engagement surface on the lower section;
    b. attaching the upper section of the apparatus to an elevated support;
    c. attaching one end of a chain sling to the lower section of the apparatus so that the chain sling contacts the chain sling engagement surface;
    d attaching a measuring device to the measuring device engagement section of the apparatus;
    e lifting the apparatus so that the chain sling hangs freely therefrom;
    f. moving the measuring device so that it extends below the remaining end of the chain sling; and,
    f. measuring the length of the chain sling.

21. An apparatus, useable with a measuring device having an end with a baseline mark and a predetermined length, for measuring a reach of an elongated, flexible, lifting member while the flexible lifting member is suspended above the ground from a support, the apparatus comprising:
    a body with an upper section and a lower section, with the upper section connectable to the support, and the lower section configured to engage the elongated, flexible, lifting member at one end thereof while allowing the remainder of the elongated, flexible, lifting member to hang freely therefrom; and
    a bracket extending outwardly from the body, the bracket configured to engage the end of the measuring device while allowing the predetermined length of the measuring device to hang freely therefrom so that the length of the measuring device is substantially parallel to the freely hanging lifting member;
    wherein the bracket positions the baseline mark of the measuring device so that the mark is at substantially the same height as a predetermined surface of the lifting member when the predetermined surface of the lifting member is engaged by the lower section of the body.

22. The apparatus of claim 21, wherein the measuring device comprises a tape measure.

23. An apparatus, useable with a measuring device having an end with a baseline mark and a predetermined length, for measuring a reach of an elongated, flexible, lifting member while the lifting member is suspended above the ground from a support, the apparatus comprising:
    a body with an upper section, a lower section and a bracket, with the upper section connectable to the support, with the lower section configured to engage the lifting member at one end of the lifting member while allowing the remainder of the lifting member to hang freely therefrom, and with the bracket configured to engage the end of the measuring device while allowing the predetermined length of the measuring device to hang freely therefrom so that the length of the measuring device is substantially parallel to the freely hanging lifting member;

wherein the bracket positions the baseline mark of the measuring device so that the mark is at substantially the same height as a predetermined surface of the lifting member when the predetermined surface of the lifting member is engaged by the lower section of the body.

24. A method of measuring a length of a chain having first and second ends, the method comprising the steps of:
   a. providing an apparatus including a body with an upper section, a lower section, and a measuring device engagement section, with the lower section having a chain engagement surface, and with the measuring device engagement section extending outwardly from the body;
   b. using the apparatus to connect the first end of the chain to an adjustable hoist;
   c. actuating the adjustable hoist to raise the apparatus so that the chain hangs freely from the chain engagement surface of the apparatus and the second end of the chain is not supported from below;
   d. attaching a first end of a measuring device to the measuring device engagement section;
   e. positioning the measuring device so that a portion of the measuring device extends below the second end of the chain; and,
   f. measuring the length of the chain.

25. The method of claim 24, wherein the step of positioning the measuring device so that a portion of the measuring device extends below the second end of the chain comprises the step of changing the length of the measuring device.

26. A method of measuring a length of a chain having first and second ends, the method comprising the steps of:
   a. providing an apparatus having a body with an upper section, a lower section, and a measuring device engagement section, with the lower section having a chain engagement surface, and with the measuring device engagement section extending outwardly from the body;
   b. using the apparatus to connect the first end of the chain to an adjustable hoist;
   c. attaching a first end of a measuring device to the measuring device engagement section;
   d. actuating the adjustable hoist to raise the apparatus so that the chain hangs freely from the chain engagement surface of the apparatus, the measuring device hangs freely from the measuring device engagement section, and the second end of the chain is not supported from below;
   e. positioning the measuring device so that a portion of the measuring device extends below the second end of the chain; and,
   f. measuring the length of the chain.

27. The method of claim 26, wherein the step of positioning the measuring device so that a portion of the measuring device extends below the second end of the chain comprises the step of changing the length of the measuring device.

* * * * *